United States Patent
Gawali et al.

(10) Patent No.: US 9,075,771 B1
(45) Date of Patent: Jul. 7, 2015

(54) TECHNIQUES FOR MANAGING DISASTER RECOVERY SITES

(71) Applicant: Symantec Corporation, Mountain View, CA (US)

(72) Inventors: Ashish Laxmanrao Gawali, Pune (IN); Shrikant Bajirao Ghare, Pune (IN)

(73) Assignee: Symantec Corporation, Mountain View, CA (US)

( * ) Notice: Subject to any disclaimer, the term of this patent is extended or adjusted under 35 U.S.C. 154(b) by 182 days.

(21) Appl. No.: 13/839,813

(22) Filed: Mar. 15, 2013

(51) Int. Cl.
*G06F 11/00* (2006.01)
*G06F 11/20* (2006.01)

(52) U.S. Cl.
CPC ........ *G06F 11/2023* (2013.01); *G06F 11/2028* (2013.01); *G06F 11/2025* (2013.01)

(58) Field of Classification Search
CPC ............................ G06F 11/2023; G06F 11/2025
USPC .................. 714/43, 4.11, 4.1, 2, 4.21, 4.3
See application file for complete search history.

(56) References Cited

U.S. PATENT DOCUMENTS

| | | | | |
|---|---|---|---|---|
| 5,673,382 A | * | 9/1997 | Cannon et al. | 714/6.31 |
| 5,799,147 A | * | 8/1998 | Shannon | 714/6.3 |
| 6,694,447 B1 | * | 2/2004 | Leach et al. | 714/6.3 |
| 6,785,786 B1 | * | 8/2004 | Gold et al. | 711/162 |
| 6,981,177 B2 | * | 12/2005 | Beattie | 714/20 |
| 7,600,146 B2 | * | 10/2009 | Liccione et al. | 714/3 |

* cited by examiner

*Primary Examiner* — Dieu-Minh Le
(74) *Attorney, Agent, or Firm* — Wilmer Cutler Pickering Hale and Dorr LLP

(57) ABSTRACT

Techniques for managing disaster recovery sites are disclosed. In one particular embodiment, the techniques may be realized as a method for managing disaster recovery sites comprising generating a heartbeat at a first node, transmitting the heartbeat from the first node to a second node, determining whether a network connection between the first node and the second node has failed, determining whether the second node has received an additional heartbeat from the first node, and changing a state of the secondary node based on the determination of whether the second node has received the additional heartbeat.

18 Claims, 5 Drawing Sheets

TECHNIQUES FOR MANAGING DISASTER RECOVERY SITES

FIELD OF THE DISCLOSURE

The present disclosure relates generally to disaster recovery and, more particularly, to techniques for managing disaster recovery sites.

BACKGROUND OF THE DISCLOSURE

Data and applications may be maintained with a high level of availability by replicating the data and applications from a primary site to a disaster recovery site. For example, the data and applications that are online and available at the primary site may be regularly replicated to a secondary disaster recovery site. Upon occurrence of a failure at the primary site, the secondary site may be brought online. However, traditional management of disaster recovery sites is typically unable to properly prevent the secondary site from being inadvertently brought online during a split-brain situation due to network partitioning.

In view of the foregoing, it may be understood that there may be significant problems and shortcomings associated with traditional disaster recovery site management technologies.

SUMMARY OF THE DISCLOSURE

Techniques for managing disaster recovery sites are disclosed. In one particular embodiment, the techniques may be realized as a method for managing disaster recovery sites comprising generating a heartbeat at a first node; transmitting the heartbeat from the first node to a second node; determining whether a network connection between the first node and the second node has failed; determining whether the second node has received an additional heartbeat from the first node; and changing a state of the secondary node based on the determination of whether the second node has received the additional heartbeat.

In accordance with other aspects of this particular embodiment, the heartbeat is generated periodically at the first node.

In accordance with other aspects of this particular embodiment, the first node is a primary site.

In accordance with other aspects of this particular embodiment, the primary site is online and hosts at least one application.

In accordance with other aspects of this particular embodiment, the second node is a disaster recovery site.

In accordance with other aspects of this particular embodiment, application data is transmitted with the heartbeat from the first node to the second node.

In accordance with further aspects of this particular embodiment, the heartbeat is periodically transmitted from the first node to the second node.

In accordance with further aspects of this particular embodiment, the heartbeat is transmitted from the first node to the second node via a replication channel.

In accordance with further aspects of this particular embodiment, the heartbeat is a timestamp.

In accordance with further aspects of this particular embodiment, the method further includes storing the heartbeat at the second node in a private region of a disk.

In accordance with additional aspects of this particular embodiment, the first node and the second node are in communication via a replication channel.

In accordance with additional aspects of this particular embodiment, the replication channel is separate from the network connection.

In accordance with additional aspects of this particular embodiment, a predetermined amount of time elapses from when it is determined that the network connection has failed to when it is determined whether the second node has received the additional heartbeat.

In accordance with additional aspects of this particular embodiment, a disaster recovery agent determines whether the second node has received the additional heartbeat.

In accordance with additional aspects of this particular embodiment, the state of the secondary node is changed to online when it is determined that the second node has not received the additional heartbeat.

In accordance with further aspects of this particular embodiment, the state of the secondary node is maintained as a disaster recovery site when it is determined that the second node has received the additional heartbeat.

In accordance with further aspects of this particular embodiment, the first node and the second node are connected to a steward via a replication channel.

In accordance with other aspects of this particular embodiment, the steward determines whether the second node has received the additional heartbeat when it is determined that the network connection has failed.

In another particular embodiment, the techniques may be realized as least one non-transitory processor readable storage medium storing a computer program of instructions configured to be readable by at least one processor for instructing the at least one processor to execute a computer process for performing the method for managing disaster recovery sites comprising generating a heartbeat at a first node; transmitting the heartbeat from the first node to a second node; determining whether a network connection between the first node and the second node has failed; determining whether the second node has received an additional heartbeat from the first node; and changing a state of the secondary node based on the determination of whether the second node has received the additional heartbeat.

In another particular embodiment, the techniques may be realized as a system for managing disaster recovery sites comprising one or more processors communicatively coupled to a network; wherein the one or more processors are configured to generate a heartbeat at a first node; transmit the heartbeat from the first node to a second node; determine whether a network connection between the first node and the second node has failed; determine whether the second node has received an additional heartbeat from the first node; and change a state of the secondary node based on the determination of whether the second node has received the additional heartbeat.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
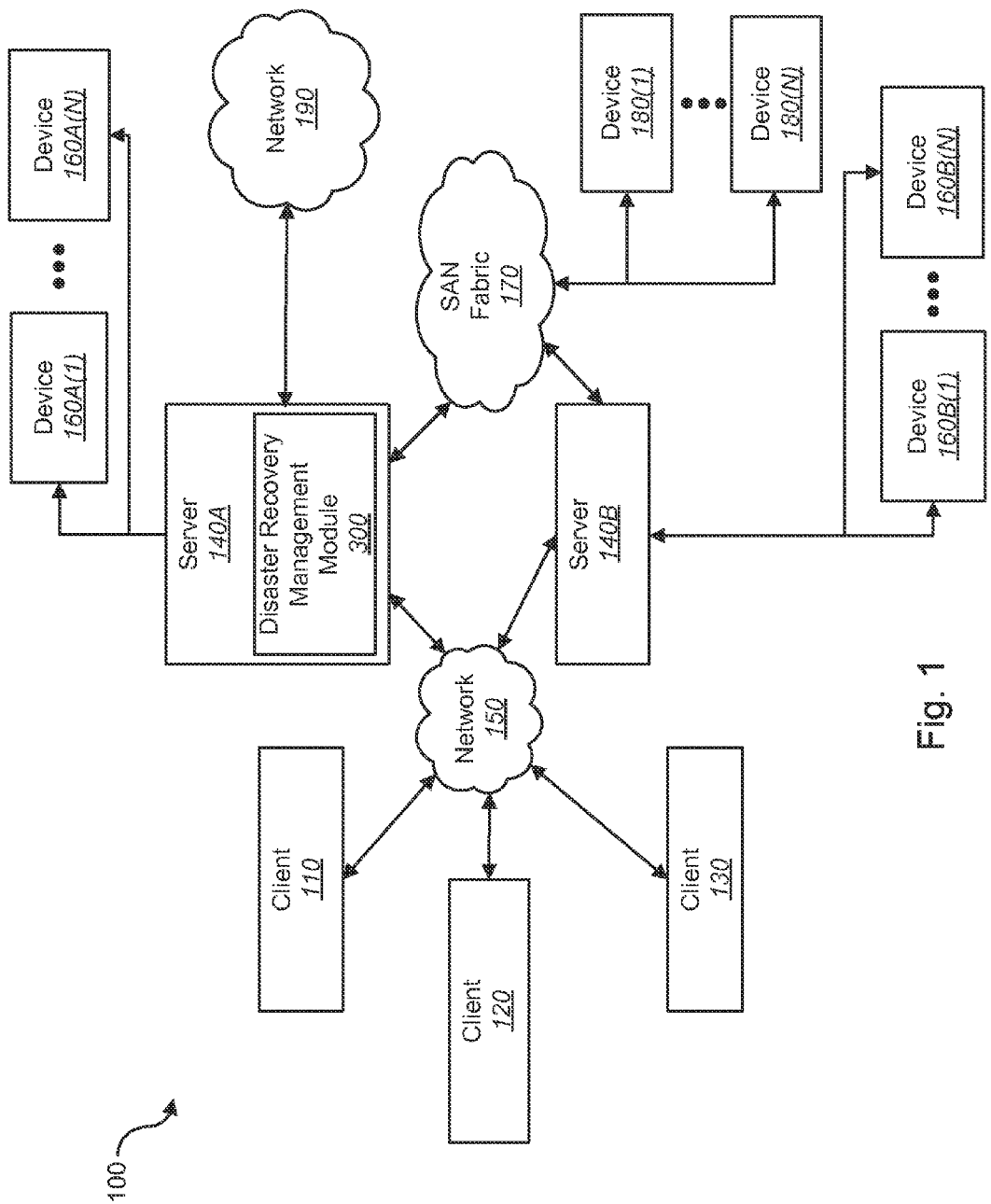
FIG. 1 shows a block diagram depicting a network architecture in accordance with an embodiment of the present disclosure.

FIG. 1 shows a block diagram depicting a network architecture for management of disaster recovery sites in accordance with an embodiment of the present disclosure.

FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140N may be communicatively coupled to storage devices 160N(1)-(N). Servers 140A-140N may contain a management module (e.g., disaster recovery management module 300). Servers 140A-140N may be communicatively coupled to a SAN (Storage Area Network) fabric 170. SAN fabric 170 may support access to storage devices 180(1)-(N) by servers 140A-140N, and by client systems 110, 120 and 130 via network 150.

Figure 2:
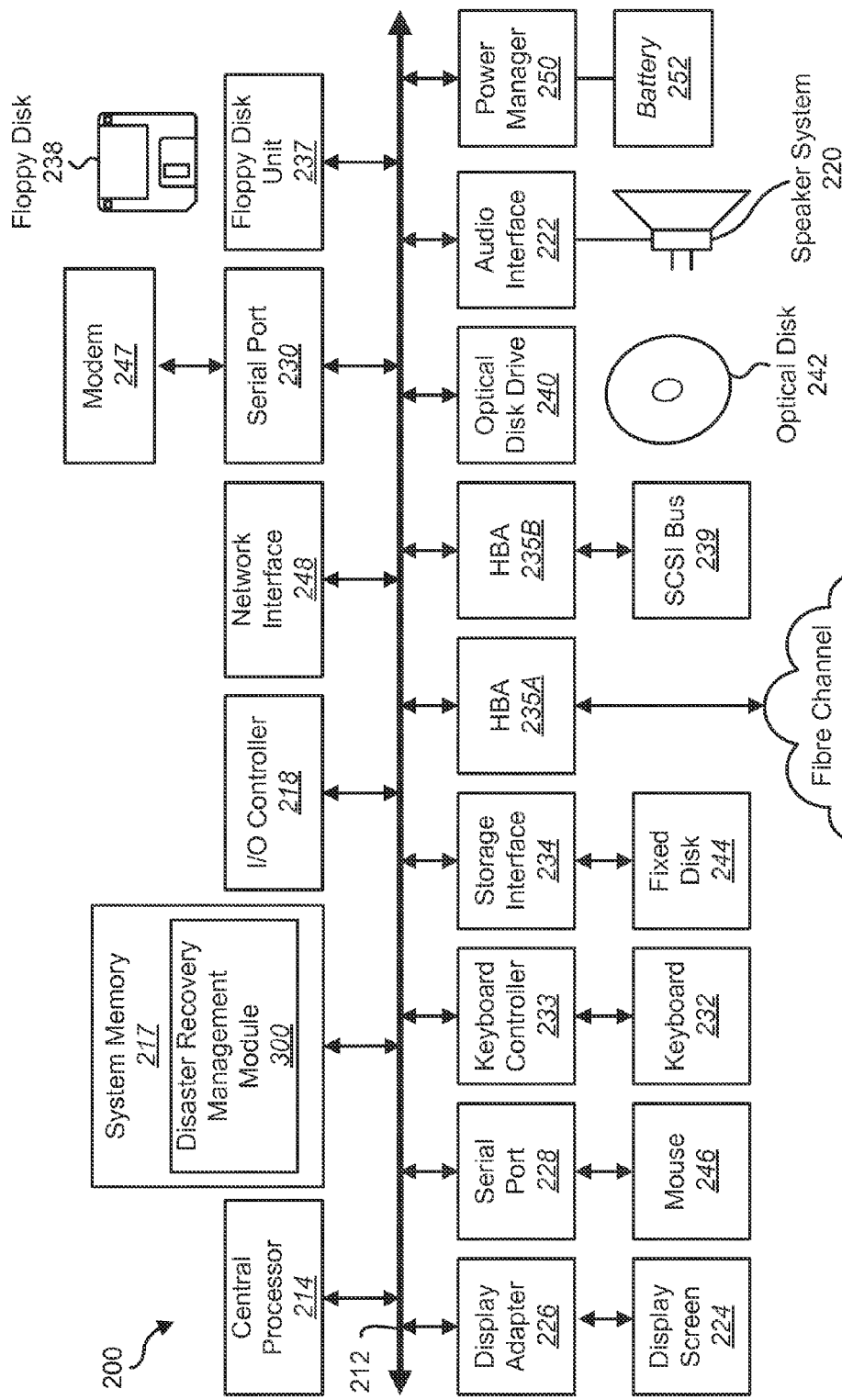
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A-140N using, for example, a web browser or other client software (not shown). Such a client may allow client systems 110, 120 and 130 to access data hosted by any one of servers 140A-140N or one of storage devices 160A(1)-(N), 160N(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160N(1)-(N), and/or 180(1)-(N) may be network accessible storage and may be local, remote, or a combination thereof to any one of servers 140A-140N. Storage devices 160A(1)-(N), 160N(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160N(1)-(N), and/or 180(1)-(N) may be used for backup or archival purposes. For example, storage devices 160N(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A-140N may be application servers, archival platforms, backup servers, network storage devices, media servers, email servers, document management platforms, enterprise search servers, or other devices communicatively coupled to network 150. Servers 140A-140N may utilize one of storage devices 160A(1)-(N), 160N(1)-(N), and/or 180(1)-(N) for the storage of application data, backup data, or other data. Servers 140A-140N may be hosts, such as an application server, which may process data traveling between clients 110, 120, and 130 and a backup platform, a backup process, and/or storage. According to some embodiments, servers 140A-140N may be platforms used for backing up and/or archiving data. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy.

According to some embodiments, server 140A may contain one or more portions of software for management of disaster recovery sites such as, for example, disaster recovery management module 300. As illustrated, one or more portions of the disaster recovery management module 300 may reside at a network centric location. For example, server 140A may be a server, a firewall, a gateway, or other network element that may perform one or more actions to manage disaster recovery sites. According to some embodiments, network 190 may be an external network (e.g., the Internet) and server 140A may be a gateway or firewall between one or more internal components and clients and the external network. According to some embodiments, the disaster recovery management module 300 may be implemented as part of a cloud computing environment.

According to some embodiments, server 140B may also contain one or more portions of software for management of disaster recovery sites such as, for example, the disaster recovery management module 300. For example, server 140B may be a server, a firewall, a gateway, or other network element that may perform one or more actions to manage disaster recovery sites.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the disaster recovery management module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
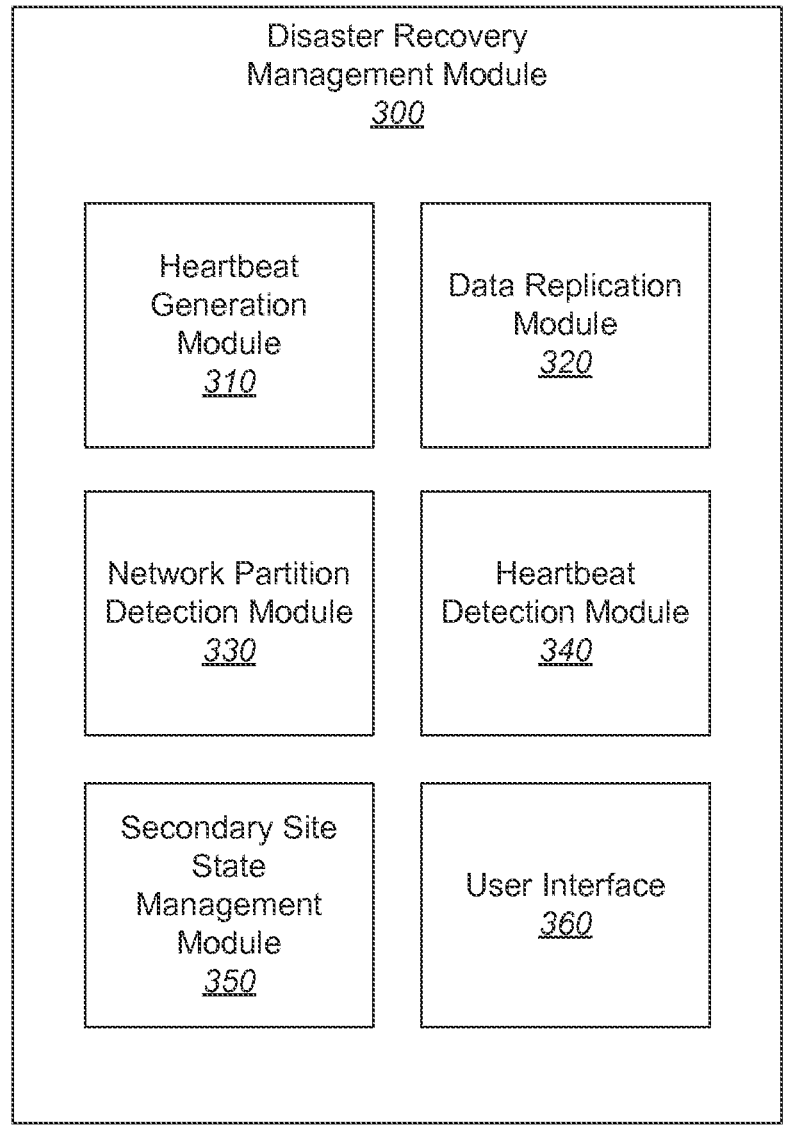
FIG. 3 shows a replicated data management module in accordance with an embodiment of the present disclosure.

FIG. 3 shows a disaster recovery management module 300 in accordance with an embodiment of the present disclosure. As illustrated, the disaster recovery management module 300 may contain one or more components including a heartbeat generation module 310, a data replication module 320, a network partition detection module 330, a heartbeat detection module 340, a secondary site state management module 350, and a user interface 360.

The heartbeat generation module 310 may generate a heartbeat that indicates the presence of a host site to a secondary disaster recovery site. In some embodiments, the heartbeat may include a timestamp. Additionally, the heartbeat generation module 310 may generate a heartbeat at predetermined times or at predetermined intervals. For example, the heartbeat generation module 310 may generate a heartbeat every thirty second, one minute, two minutes, or any other appropriate period of time for transmission from a primary host site to a secondary disaster recovery site.

The data replication module 320 may replicate data from a primary site to a secondary site. In some embodiments, the data may be application data for an application hosted by or running on the primary site. In at least one embodiments, the data replication module 320 may transmit the data to be replicated to the secondary site via a separate replication channel. Further, the data replication module 320 may transmit the heartbeat generated by the heartbeat generation module 310 along with the data to the secondary site.

The network partition detection module 330 may determine whether a network partition has occurred. For example, the network partition detection module 330 may determine whether there has been a failure in a network connection between the primary site and the secondary site. Additionally, the network partition detection module 330 may determine the type of network partition or fault that has occurred. For instance, the network partition detection module 330 may determine whether the network partition was caused by any one of a plurality of events such as a software or hardware failure. In some embodiments, the network partition detection module 330 may determine whether a network partition has occurred by transmitting a request or to each site within the network at periodic intervals. Further, the network partition detection module 330 may determine whether a network partition has occurred when the data replication module 320 attempts to replicate the data from the primary site to the secondary site.

The heartbeat detection module 340 may determine whether heartbeats are being written to a secondary site. In some embodiments, the heartbeat detection module 340 may determine whether heartbeats are being written to the secondary site when the network partition detection module 330 has determined that a network partition occurred. In at least one embodiment, the heartbeat detection module 340 may determine whether a heartbeat has been written to a private region of a disk or volume at the secondary site within a specific period of time. The heartbeat detection module 340 may also determine whether a heartbeat stored at the secondary site has been written over by a new heartbeat received from the primary site via the replication channel. Further, the heartbeat detection module 340 may determine whether the heartbeat at the secondary site is increasing.

The secondary site state management module 350 may change a state of the secondary site based on an output from the network partition detection module 330 and the heartbeat detection module 340. For example, the secondary site state management module 350 may bring the secondary site online when a network partition has been detected by the network partition detection module 330 and the heartbeat detection module 340 has determined that heartbeats are not being written from the primary site. The secondary site state management module 350 may also bring the secondary site online such that an application may run on the secondary site instead of the primary site and data may be replicated from the secondary site to another data recovery site.

The user interface 360 may provide a user or administrator with control over the disaster recovery management module 300 and the data replication process. For example, the user or administrator may specify via the user interface 360 which site the primary site is to replicate data to and how often. In addition, the user interface 360 provide the user or administrator with information about the status of each of the sites and any additional information about the data replication process. Further, a user or administrator may specify a policy of how to handle a network partition via the user interface 360.

Figure 4:
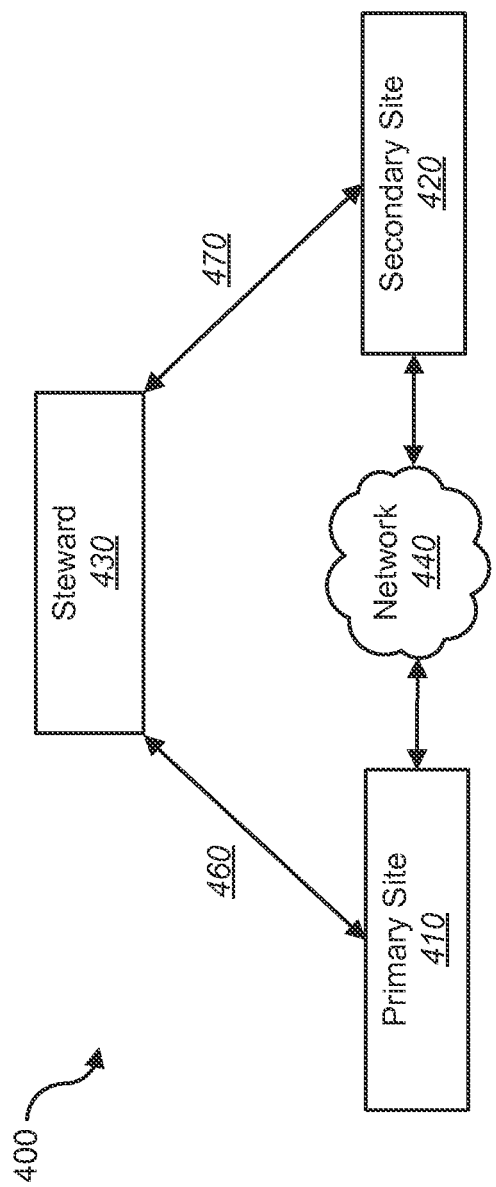
FIG. 4 shows a block diagram depicting disaster recovery sites in a multi-node computing environment in accordance with an embodiment of the present disclosure.

FIG. 4 shows block diagram depicting disaster recovery sites in a multi-node computing environment 400 in accordance with an embodiment of the present disclosure. As illustrated, the multi-node computing environment 400 may include a primary site 410 and a secondary site 420 having a main connection with the primary site 410 via a network 440. The secondary site 420 may be a disaster recovery site storing data replicated from the primary site 410.

The multi-node computing environment 400 may also include a steward 430 connected to each of the primary site 410 and the secondary site 420. The steward 430 may connect to the primary site 410 via a replication channel 460 and to the secondary site 420 via a replication channel 470. In some embodiments, the steward 430 may be a Veritas Cluster Server (VCS) Replication Agent available from Symantec Corp. In other aspects of the embodiment, the replication channels 460 and 470 are separate and distinct from the network 440.

Figure 5:
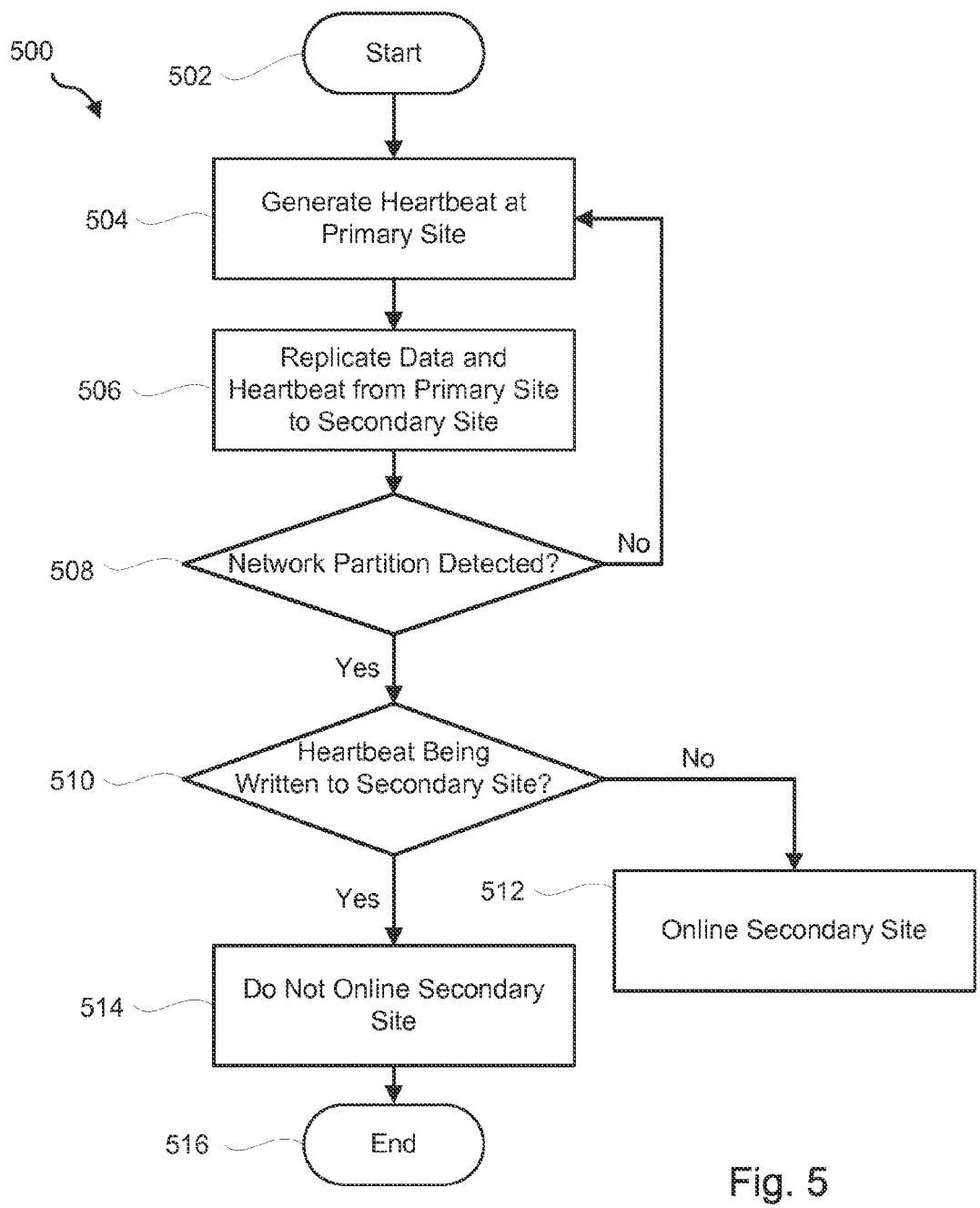
FIG. 5 shows a method for managing the disaster recovery sites in a multi-node computing environment in accordance with an embodiment of the present disclosure.

FIG. 5 shows a method 500 for managing the disaster recovery sites in a multi-node computing environment in accordance with an embodiment of the present disclosure. In some embodiments, the method 500 may be implemented in association with VERITAS Volume Manager (VxVM) from Symantec Corp. At block 502, the method 500 may begin.

At block 504, a heartbeat may be generated at a primary site. In some embodiments, the heartbeat generation module 310 may generate the heartbeat at the primary site. In at least one embodiment, the heartbeat may be generated periodically or at predetermined intervals. In addition, the heartbeat may include a timestamp. After the heartbeat has been generated at the primary site, the process may then proceed to block 506.

At block 506, data may be replicated from the primary site to the secondary site. In some embodiments, the data replication module 320 may replicate the data from the primary site to the secondary site. In addition, the heartbeat generated at block 504 may be replicated from the primary site to the secondary site with the replicated data. The data that is replicated may be any type of data generated or stored at the primary site. For example, the data at the primary site may be application data or a database. Further, when the primary site is online, the primary site may be in a writable state such that an application running at the primary site may write to the volumes of the primary site and that application data may be replicated to the secondary site.

In some embodiments, the data and the heartbeat may be replicated from the primary site to the secondary site via a replication channel that is separate from a direct network connection between the primary and secondary sites. Additionally, a steward may be arranged within the replication channel that receives the data and heartbeat from the primary site via the replication channel and passes the data and heartbeat to the secondary site via the replication channel. For example, the primary site 410 may transmit the data and the heartbeat to the steward 430 via replication channel 460, and the steward may forward the data and heartbeat to the secondary site 420 via the replication channel 470. After the data and the heartbeat have been replicated to the secondary site, the process may then proceed to block 508.

At block 508, it may be determined whether a network partition has been detected. In some embodiments, the network partition detection module 330 may determine whether a network partition has occurred. A network partition may occur when a network connection between a primary site and a secondary site fails. For example, the network partition may occur when the network 440 fails such that the primary site 410 is not able to communicate directly with the secondary site 420 via the network 440. If it is determined that a network partition has not been detected, the process may proceed to block 504.

If a network partition has been detected, the network partition detection module 330 may determine what type of network partition has occurred. For example, the network partition detection module 330 may determine whether a split brain condition has occurred. In one example of a split brain condition, an application may be running on a primary site, the data supporting the application may have been replicated to a secondary site, and a direct connection between the primary site and the secondary site may have failed such that it may be necessary to bring the secondary site online. If it is determined that a network partition has been detected at block 508, the process may then proceed to block 510 before bringing the secondary site online.

At block 510, it may be determined whether a heartbeat from the primary site is being written to the secondary site. In some embodiments, the heartbeat detection module 340 may determine whether a heartbeat from the primary site is being written to the secondary site. The heartbeat may be replicated from the primary site 410 to the secondary site 420 via replication channel 460, steward 430, and replication channel 470. In at least one embodiment, the heartbeat may be stored in a private region of the volumes on the secondary site 420 that are separate from the replicated data from the primary site 410. The private regions of the secondary site may also allow a user to save user defined tags of the disks or volumes included at the secondary site.

In accordance with further aspects of this particular embodiment, the steward 430 may determine whether the heartbeat is still being written to the secondary site 420. For example, upon detection of a network partition at block 508, the steward may wait a predetermined period of time and determine whether a new heartbeat has been written to the secondary site within that time. In some embodiments, the heartbeat stored at the secondary site is written over by the received heartbeat such that the steward may determine whether the heartbeat at the secondary site has been updated or replaced with a new heartbeat within a specific period of time.

If it is determined that the heartbeat is not being written to the secondary site, the process may proceed to block 512. At block 512, the secondary site may be brought online. In some embodiments, the secondary site state management module 350 may bring the secondary site online such that the secondary site is in a writable state, an application is running on the secondary site, and data may be replicated from the secondary site to another disaster recovery site.

Alternatively, if it is determined that the heartbeat has been written to the secondary site, the process may proceed to block 514. At block 514, the state of the primary site may be maintained and the state of the secondary site may be maintained. For example, the primary site may continue to run an application such that the volumes of the primary site are writable and data from the primary site is replicated to the secondary site. The process may then proceed back to block 502 such that the entire process 500 may repeat periodically.

At this point it should be noted that management of disaster recovery sites in accordance with the present disclosure as described above may involve the processing of input data and the generation of output data to some extent. This input data processing and output data generation may be implemented in hardware or software. For example, specific electronic components may be employed in management of disaster recovery sites or similar or related circuitry for implementing the functions associated with management of disaster recovery sites in accordance with the present disclosure as described above. Alternatively, one or more processors operating in accordance with instructions may implement the functions associated with management of disaster recovery sites in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing disaster recovery sites comprising the steps of:
   generating a heartbeat at a first node;
   transmitting the heartbeat from the first node to a second node;
   determining whether a network connection between the first node and the second node has failed;
   determining whether the second node has received an additional heartbeat from the first node; and
   changing a state of the secondary node based on the determination of whether the second node has received the additional heartbeat,
   wherein the first node and the second node are in communication via a replication channel separate from the network connection.

2. The method of claim 1, wherein the heartbeat is generated periodically at the first node.

3. The method of claim 1, wherein the first node is a primary site.

4. The method of claim 3, wherein the primary site is online and hosts at least one application.

5. The method of claim 1, wherein the second node is a disaster recovery site.

6. The method of claim 1, wherein application data is transmitted with the heartbeat from the first node to the second node.

7. The method of claim 1, wherein the heartbeat is periodically transmitted from the first node to the second node.

8. The method of claim 1, wherein the heartbeat is transmitted from the first node to the second node via the replication channel.

9. The method of claim 1, wherein the heartbeat is a timestamp.

10. The method of claim 1, further comprising:
    storing the heartbeat at the second node in a private region of a disk.

11. The method of claim 1, wherein a predetermined amount of time elapses from when it is determined that the network connection has failed to when it is determined whether the second node has received the additional heartbeat.

12. The method of claim 1, wherein a disaster recovery agent determines whether the second node has received the additional heartbeat.

13. The method of claim 1, wherein the state of the secondary node is changed to online when it is determined that the second node has not received the additional heartbeat.

14. The method of claim 1, wherein the state of the secondary node is maintained as a disaster recovery site when it is determined that the second node has received the additional heartbeat.

15. The method of claim 1, wherein the first node and the second node are connected to a steward via the replication channel.

16. The method of claim 15, wherein the steward determines whether the second node has received the additional heartbeat when it is determined that the network connection has failed.

17. At least one non-transitory processor readable storage medium storing a computer program of instructions configured to be readable by at least one processor for instructing the at least one processor to execute a computer process for performing the method as recited in claim 1.

18. A system for managing disaster recovery sites comprising:
    one or more processors communicatively coupled to a network; wherein the one or more processors are configured to:
      generate a heartbeat at a first node;
      transmit the heartbeat from the first node to a second node;
      determine whether a network connection between the first node and the second node has failed;
      determine whether the second node has received an additional heartbeat from the first node; and
      change a state of the secondary node based on the determination of whether the second node has received the additional heartbeat,
    wherein the first node and the second node are in communication via a replication channel separate from the network connection.

* * * * *